Nov. 19, 1963 W. W. R. SEARLE 3,111,017
TIMER CONTROL FOR AUTOMATIC WASHING AND DRYING MACHINES
Filed Aug. 5, 1958
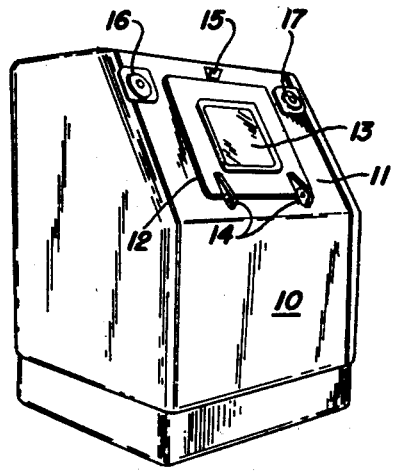
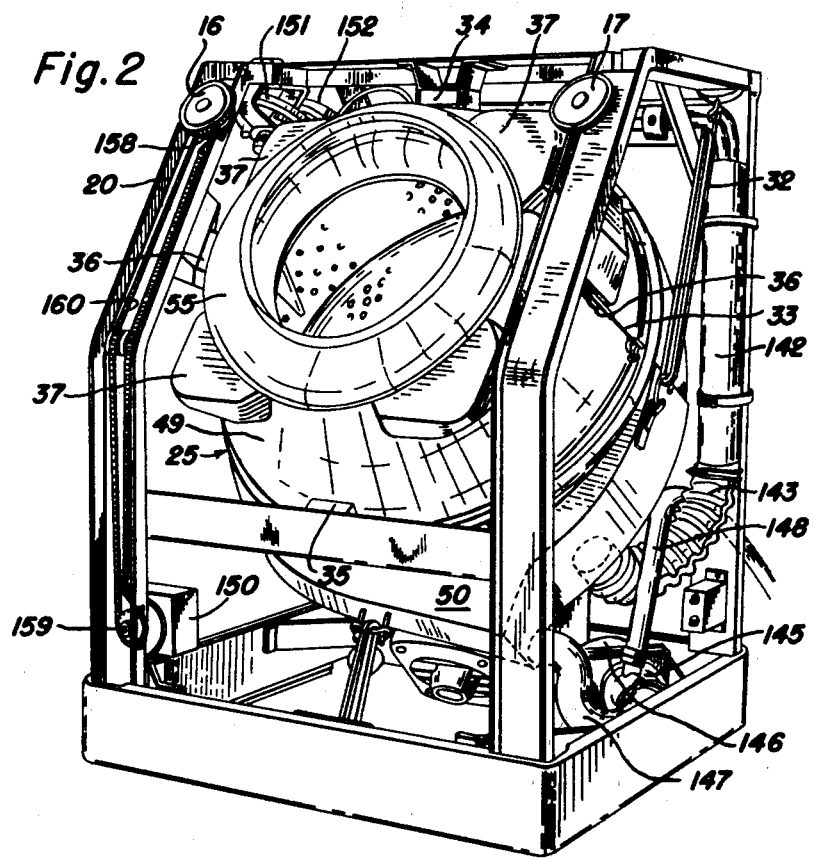

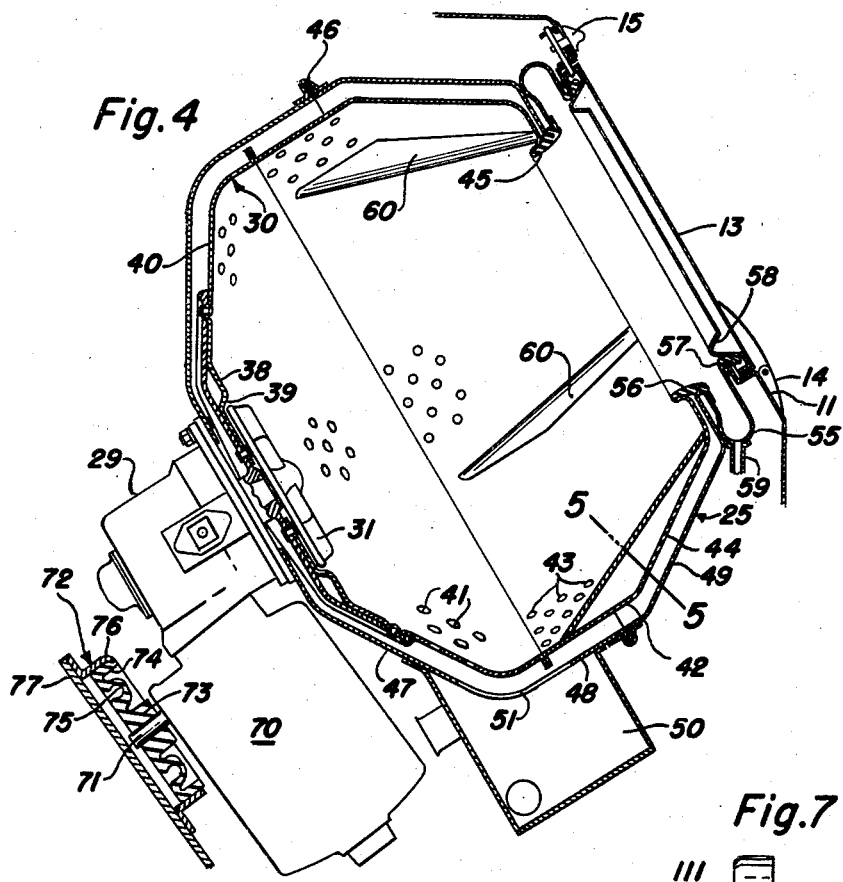

United States Patent Office

3,111,017
Patented Nov. 19, 1963

3,111,017
TIMER CONTROL FOR AUTOMATIC WASHING AND DRYING MACHINES
Walter W. R. Searle, Ickenham, Uxbridge, England, assignor to The Hoover Company, North Canton, Ohio, a corporation of Ohio
Filed Aug. 5, 1958, Ser. No. 753,370
Claims priority, application Great Britain Oct. 17, 1957
1 Claim. (Cl. 68—12)

The present invention relates to an automatically timed clothes washer and drier including a spin basket rotatably mounted within a stationary container, and more particularly to interrupting the timing cycle during certain periods of draining water and during spinning periods if the water level rises above an optimum level.

This application includes the same disclosure as in prior application Serial No. 694,280, filed November 4, 1957, now Patent No. 2,968,174.

According to one object of the invention means are provided for automatically stopping the timing means during periods when liquid is being emptied from the container.

According to another object of the invention means are provided for automatically stopping the timing means as well as stopping the spinning drive to the basket during spin drying periods if the liquid level in the container rises above a predetermined low level.

The means for automatically switching off the timing means, in one or each of the circumstances referred to above, may include a level-responsive switch operating at a predetermined low level.

For stopping the timing means during emptying periods there may in addition be provided a level-responsive switch operating at a predetermined high level, the timing means being connected so as to be stopped during emptying periods when the level is between the predetermined high level and the predetermined low level.

In one form of the invention the timing means comprise an electric timer motor connected in series with two parallel branch circuits, one including close-when-empty contacts and the other including close-when-full contacts so as to be open circuited when the level is between the predetermined high level termed full, and the predetermined low level termed empty. Conveniently the rotation of the basket at spinning speed is controlled by a spin control device, such as a solenoid operating a clutch, connected in series with timer contacts in a circuit in parallel with that of the timer motor so as also to be open-circuited when the level is between full and empty.

Preferably means is provided for also stopping the timing means during filling periods. Thus the arrangement may include one or more valves for admitting water to the casing, and electrical control means for such valves connected in series with timer contacts and with close-when-not-full contacts. The close-when-full contacts may be connected in series with timer contacts arranged to be open during spinning periods but closed during filling periods, so as to ensure that the spin control device cannot be operated through the close-when-full contacts, but to restart the timing means at the end of a filling period.

Thus one arrangement includes hot and cold filling valves having electrical control devices connected in series with timer contacts so as to open the hot valve alone for an initial filling period for washing, and to open both valves simultaneously for one or more subsequent filling periods for rinsing. A manually controlled hot-automatic-cold switch may be connected so that in the automatic position during the initial filling period only the hot valve is opened and during a subsequent filling period both valves are opened, in the hot position only the hot valve is opened during any filling period and in the cold position only the cold valve is open during any filling period. Conveniently in the automatic position the hot valve control device is connected through timer contacts and the not-full contacts while the cold valve control device is connected in series with other timer contacts both being connected in parallel with the hot valve control device; in the hot position the cold valve circuit is broken; and in the cold position the hot valve circuit is broken and the timer contacts in series with the cold valve control device only are short-circuited.

In a preferred form of the invention the machine has a door giving access to the container and contacts controlled by the door serving to open-circuit a control device controlling the rotation of the basket at spinning speed so as to prevent such rotation when the door is open. The timing means may also be connected in series with the door-controlled contacts so as to be switched off so long as the door is open.

The stopping of the timing means during periods when liquid is being emptied from the container or during spinning periods if the liquid level rises too high and the spinning is interrupted, has the advantage that any time so occupied is not at the expense of subsequent operations and such operations will be appropriately delayed. Thus, for example, if the empyting pump or the passages leading to or from it should become blocked, or if any any other reason the rate of emptying should be slowed down, there is no fear that the next operation will begin before the container is emptied. Indeed if the pump or passages should become completely blocked the next operation will be indefinitely postponed. Similarly if the rate at which liquid is discharged during early stages of the spinning operation is such that the pump cannot keep the level down to the empty mark, the spinning control device will be operated to render the spinning drive to the basket effective, so as to prevent overloading of the motor driving the basket. Simultaneous stopping of the timing means ensures that any period so lost is not at the expense of the period normally allotted for spinning but on the contrary the full spinning period would be allowed as soon as the pump has removed the water and reduced the level to the empty mark. In these circumstances the volume of the container over and above that of the rotating basket can be reduced to a minimum, while at the same time the capacity of the pump need not be chosen to cope with a peak delivery which even in the worst circumstances occurs for only a few seconds in each cycle and often does not occur throughout the whole cycle.

Stopping the timing means if the door should be opened has similar advantages. Thus in the interests of safety, it is important that the spinning of the basket should be interrupted if the door is opened. If the timer continues during such periods the effective spinning period will in fact be reduced. Where, as is preferred, the timing means is in any event stopped during filling periods the opening of the door during such periods will not affect the situation, and if the user wishes to test the temperature of the water during filling she can do so without interfering with the cycle in any way.

The invention may be carried into practice in various ways but one specific embodiment will be described by way of example with reference to the accompanying drawings, in which FIGURE 1 is a perspective external view of a complete automatic washing and spin drying machine;
FIGURE 2 is a right front perspective view of the washing machine with the outer casing removed;
FIGURE 3 is a left rear perspective view;
FIGURE 4 is a longitudinal section of the main working parts of the washing machine;
FIGURE 5 is an enlarged fragmentary section on the line 5—5 of FIGURE 4 showing the cross-section of a rib;

FIGURE 7 is a view of one of the coil spring clutches, progressively broken away or sectioned;

Figure 3:
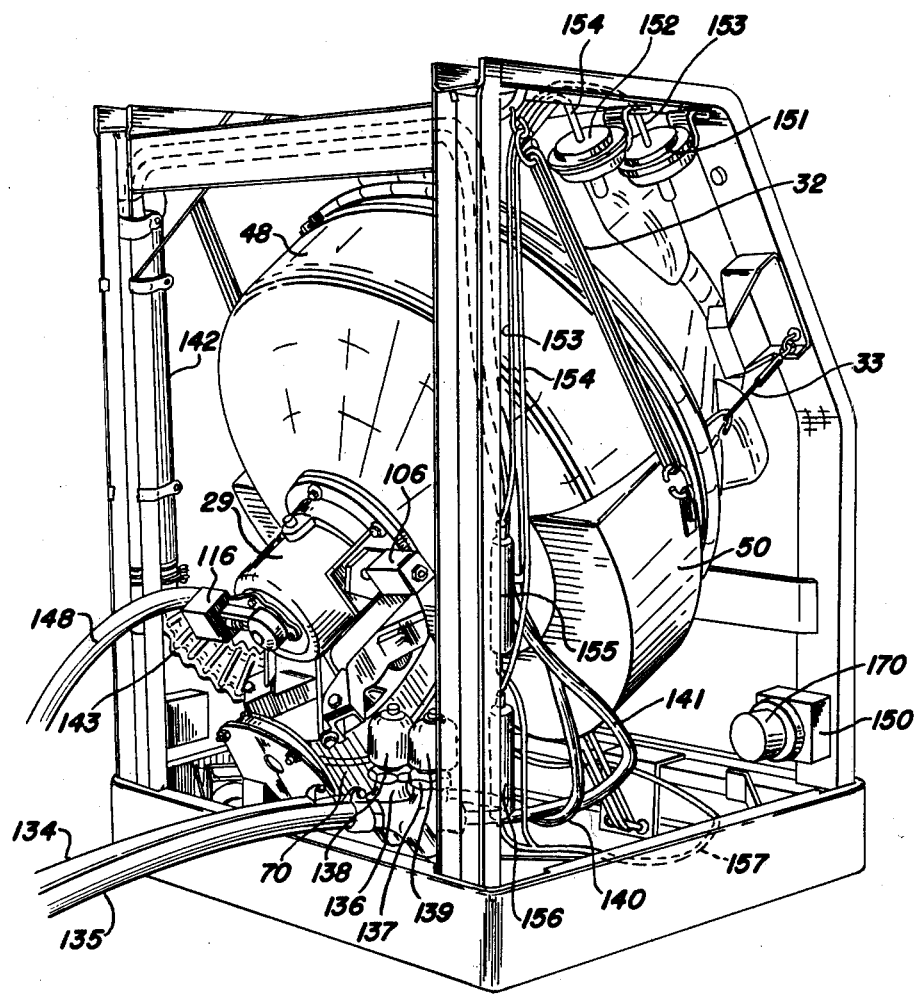

As shown in FIGURE 1, the combined washing and spin drying machine comprises an outer casing 10 of generally rectangular form with a top forward corner edge cut off obliquely to provide a sloping access panel 11 having in it an opening 12 for the insertion and removal of clothes, the opening being normally closed by a door 13 having an observation window. The door 13 is mounted on hinges 14 at its lower edge and provided with a latch 15 at its upper edge to held it closed. To the left and right of the opening are control dials 16 and 17 for a timer and a hot-automatic-cold switch respectively.

As shown in FIGURES 2 to 4 the casing contains a frame 20, chiefly made up of channel section members, in which a stationary container 25 is suspended. Rigidly secured to one end of the container 25 is a casing 29 which houses a gearbox and affords bearings for a rotary washing and spin drying basket 30, and a disc-like washing impeller 31 is mounted coaxially in the end of the spin drying basket. The impeller 31 may be of the form disclosed in United States Patent No. 2,478,188.

The container 25 is suspended in the frame 20 by means of rubber belts 32 and wire ties 33, and the frame is provided with upper and lower buffers or cushions 34 and 35 and side buffers 36. When the container is filled with liquid it rests gently against the lower buffer 35. When it is emptied prior to spin drying the container is lifted clear of the buffers, its weight being supported jointly by the wire ties and rubber belts whereby the latter provide resilience and damping. In the event of excessive vibration the container may engage any one of the buffers which will serve as a stop to check such vibration. Near its mouth the container is provided with four weights 37 to add to the inertia of the non-rotating part of the suspended system and hence reduce the effects of lack of balance in the rotating part.

As shown in FIGURE 4 the spin drier basket is of perforated sheet metal comprising a generally flat circular rear wall 38 affording a recess 39 for the impeller 31, and merges at its outer periphery into a shallow frusto-conical wall 40 which has in it a narrow band of relatively large holes 41 to assist rapid filling. The wall 40 curves into a generally cylindrical portion 42 in which most of the holes 43 are formed and then merges into a deeper tapered portion 44 having an opening 45 for insertion and removal of the clothes situated at the end remote from the gearbox and presented adjacent the opening 12 in the sloping front upper panel of the casing. The outer stationary container 25 is of generally similar shape also comprising a conical end wall 47, a cylindrical portion 48 and a tapered portion 49, and closely encloses the basket 30. The stationary container 25 is made in two portions having flanges secured together as indicated at 46 in a plane at right angles to the axis, so as to permit assembly. The lower part of the container is encircled by a sump 50 of the somewhat crescent-shaped form shown in FIGURES 2 and 3 and the wall of the container is slotted or omitted as shown at 51 in FIGURE 4 to afford communication between the interior of the sump 50 and that of the container 25. In the drawings the sump 50 is shown as fabricated separately from the container 25 but if preferred it may be made as part of it in the form of a gentle bulge or protuberance merging smoothly into the container.

The mouth of the tapered portion 49 of the container 25 is connected to the opening 12 in the outer casing by means of an annular bellows 55 of molded resilient material such as rubber forming a watertight seal while allowing swinging or vibrating movement of the stationary casing. As shown in FIGURE 4 the rear edge of the bellows 55 is formed by a rear ring 56 of molded rubber which is secured to the container 25 and extends into the mouth 45 of the basket 30 to cover the intervening gap. The front edge of the bellows is formed by a front-ring 57 of molded rubber having a groove to receive the margin of the opening 12 in the sloping front access panel 11 and forms a seal with an annular rib 58 on the door 13. A pipe 59 extends from the bottom of the bellows to drain any liquid that may collect in it, down into the sump 50.

The rotating basket 30 has in it five ribs 60 of smoothly curved cross-section extending from the opening 45 to the rear end of the cylindrical portion 42, generally lying in planes passing through the axis of rotation. FIGURE 5 shows the section of a rib at its deepest point.

The axis of rotation of the basket 30 is inclined to the horizontal at a convenient angle, say 35 degrees, the dimensions being such that the lowest point of the access opening 12 is slightly above the highest point of the impeller 31 so that the water level may be above the impeller but below the access opening.

A main electric driving motor 70 is bolted to the gearbox 29 for the purpose of driving the impeller 31 and also driving the washing and spin drying basket 30 either at a slow speed in the opposite direction to the impeller for washing, or at a high speed for spin drying. As shown in FIGURE 4 the motor casing carries a pin 71 connected to a vibration damper or snubber 72. The snubber 72 comprises a rubber molding having inner and outer rings 73 and 74 respectively connected together by a number of somewhat S-shaped arms 75. The outer ring 74 is bonded into an angle section ring 76 secured to a sloping plate 77 carried by the frame 20 of the machine.

Figure 6:
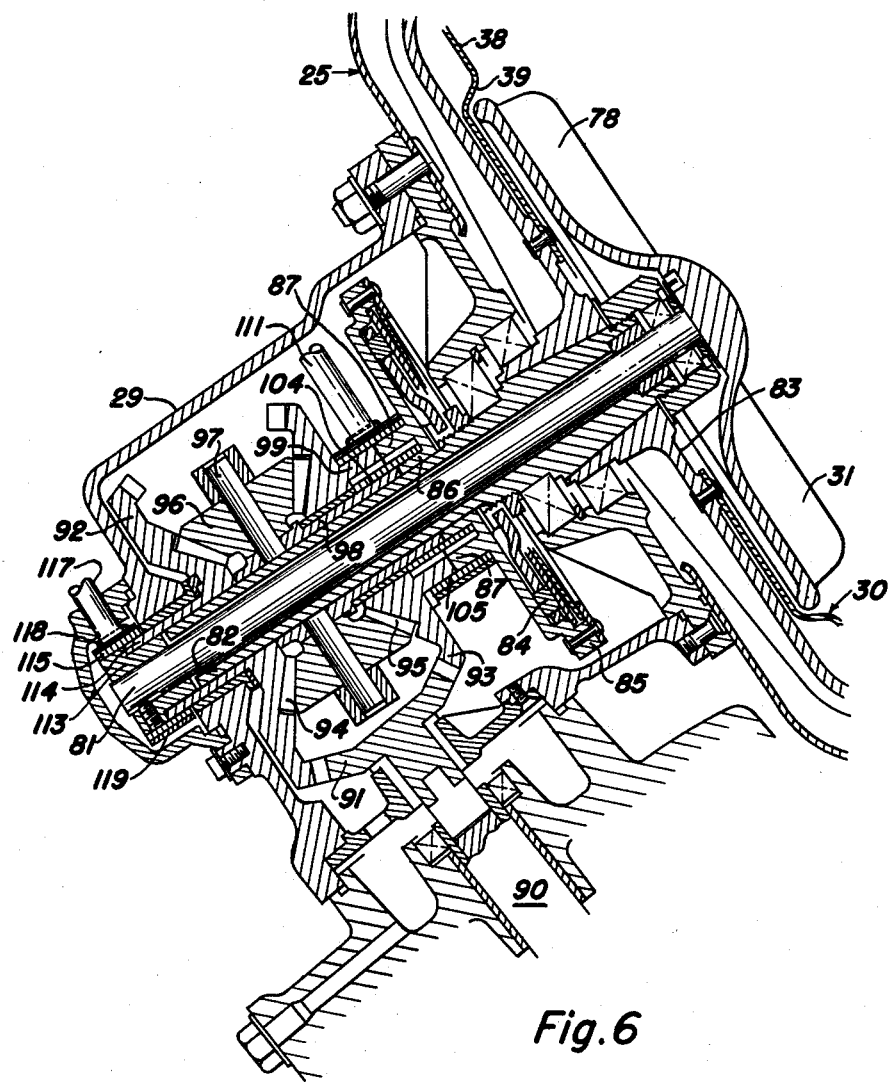
FIGURE 6 is a view similar to part of FIGURE 4 showing the gearbox in section on a larger scale.

The arrangement of the gearbox is shown in FIGURE 6. From this figure it will be seen that the impeller 31 is in the form of a disc having on its exposed surface a number of smoothly curved radial ribs 78 and is carried on a central shaft 81. The impeller shaft 81 is surrounded by a hollow shaft 82 to which is rigidly secured a hub 83 serving to reinforce and carry the inner end of the washing and spin drying basket 30. Rigidly mounted on the hollow basket shaft 82 is a driven member 84 of an overload friction clutch having a driving member 85 provided with an inner front sleeve 86 and an outer front sleeve 87.

The main driving motor 70 has a shaft 90 driving a bevel gear 91 meshing with and driving a pair of driven bevel gears 92 and 93. The motor 70 is mounted with its axis not quite at right angles to that of the impeller shaft 81 and the rear driven gear 92 is slightly larger than the front driven gear 93 so that the latter rotates slightly faster than the former. Each of the gears 92 and 93 also includes a set of bevel teeth 94 and 95 which have the same number of teeth and mesh with a pair of planet bevel gears 96 carried by radial shafts 97 forming a spider secured to an inner rear sleeve 98 the forward end of which abuts the inner front sleeve 86. The driven gear 93 has a rear outer sleeve 99 which abuts the end of the front sleeve 87.

It will be appreciated that rotation of the driving gear 91 rotates the front driven gear 93 in one direction while simultaneously rotating the rear driven gear 92 in the opposite direction at a slightly lower speed. The speed of the spider 97 will correspond with half the algebraic sum of the speeds of the two driven gears 92 and 93, and accordingly the spider will rotate in the same direction as the front driven gear 93 but at a very much lower speed.

The adjacent ends of the inner front and rear sleeves 86 and 98 are coupled together by means of an inner helical coil clutch 104 which encircles them. This clutch is not under manual control and acts as a freewheel to transmit a drive from the spider 97 to the basket 30 at a slow speed at all times when there is no drive to the basket at a greater speed by other means. At the same time the adjacent ends of the outer front sleeves 87 and 99 are coupled together by an outer helical coil clutch 105. The coil clutch 105, shown on a larger scale in FIGURE 7, is under the control of a solenoid 106. The coil 105 is surrounded by a collar 107 having a slot 108 through which projects the outturned leading end 109 of the coil 105. The collar 107 also has a projection 110 punched out from it and the solenoid 106 controls a stop 111 which can be projected by a spring (not shown) into the path of the projection 110 or can be withdrawn by energizing the solenoid.

The operation of the clutch is that when the solenoid 106 is energized to withdraw the stop 111 the movement of the gear 93 is such as to wind up the coil 105 and tighten it round the outer sleeves 87 and 99 so as to lock them together. When, however, the solenoid 106 is de-energized the stop 111 is moved by the unshown spring into the path of the projection 110 so as to arrest rotation of the collar 107, thereby stopping the movement of the leading end of the spring 105 and causing it to unwind and expand so as no longer to grip the outer sleeves 87 and 99. Accordingly when the solenoid 106 is energized the basket 30 will be coupled to the bevel 93 and as this is rotating very much faster than the spider 97 the basket 30 will be rotated at a correspondingly high speed and the inner helical coil clutch 104 will merely overrun, functioning as a free wheel.

Rigidly secured to the rear end of the impeller shaft 81 is a collar 113 about which is rotatably arranged a rear sleeve 114 of the rear driven gear 92, and a rear helical coil clutch 115 encircles a part of the collar 113 and a part of the rear sleeve 114 so as to be capable of coupling the impeller shaft 81 to the rear driven gear 92. As in the case of the clutch 105 the clutch 115 is controlled by a solenoid 116 acting on a stop 117 which can be withdrawn by the solenoid from the path of a projection 118 on a collar 119. Accordingly if the impeller solenoid 116 is energized but the basket solenoid 106 is not, the impeller will be rotated at high speed with the rear gear 92, while the basket will rotate slowly in the opposite direction with the spider 97.

It will be appreciated that the arrangement of the gear-box 29 provides for a number of different speeds in a very compact manner. In particular the slow rotation of the basket 30 for washing and rinsing requires a reduction ratio of the order of perhaps 30:1. The fast rotation of the basket 30 requires very little reduction ratio and it is naturally desirable that it should be in the same direction as the slow rotation. On the other hand the rotation of the impeller 31 requires very little reduction but it is desirable that it should be in the opposite direction to that of the basket 30. The arrangement described meets these requirements in a compact and simple manner.

Thus in one specific case with a motor speed of 1420 r.p.m. the gear ratios are such as to give the gear 92 a speed of 650 r.p.m. and the gear 93 a speed of 745 r.p.m. (in the opposite direction). This gives the spider 97 a speed of about 47 r.p.m. in the same direction as the gear 93.

For the purpose of automatically filling the machine it is provided with hot and cold inlet pipes 134 and 135 controlled by hot and cold inlet valves 136 and 137 actuated by hot and cold solenoids 138 and 139. Extending from the valves 136 and 137 are pipes 140 and 141 leading to the top of and across the machine into an atmospheric head pipe 142 of which the lower end communicates through a flexible corrugated pipe 143 with the sump 50.

In order to empty the container 25, a pump 145 is provided (seen in FIGURE 2) which is driven by an electric motor 146 and serves to draw liquid from the sump 50 through a pipe 147 and discharge it through an outlet hose 148.

The whole operation of the machine is under the automatic control of a timer 150 and a pair of level-responsive switches 151 and 152 connected by pipes 153 and 154 to pressure accummulators 155 and 156 respectively. From the bottoms of both pressure accumulators a single pipe 157 runs round the bottom of the machine and opens into the pipe 147 so as to communicate with the bottom of the sump. Each pressure accumulator consists simply of a cylindrical vessel of which the upper part will contain air and the lower part liquid when the switch is to operate. Due to the cross-section of the accumulator a comparatively small change of level will produce the displacement of air needed to operate the switch 151 or 152, as compared with what would be required if the liquid surface were in a small pipe.

The switches 151 and 152 may be of known type comprising a flexible diaphragm acting against an adjustable spring to operate snap-action contacts. The switch 151 has one pair of contacts which closes when the container is approximately empty while the switch 152 has two pairs of contacts one of which closes when the container is full and one of which closes when the container is not full.

The timer 150 consists of a small self-starting synchronous motor 170 driving a number of cams which serve to control eight pairs of contacts 171 to 178. The general construction of the timer is well known and the cams may be arranged in various ways, for example one cam may operate more than one of the pairs of contacts 171 to 178. The timer is connected by sprockets 158 and 159 and a chain 160 to the timer control dial 16.

Figure 8:
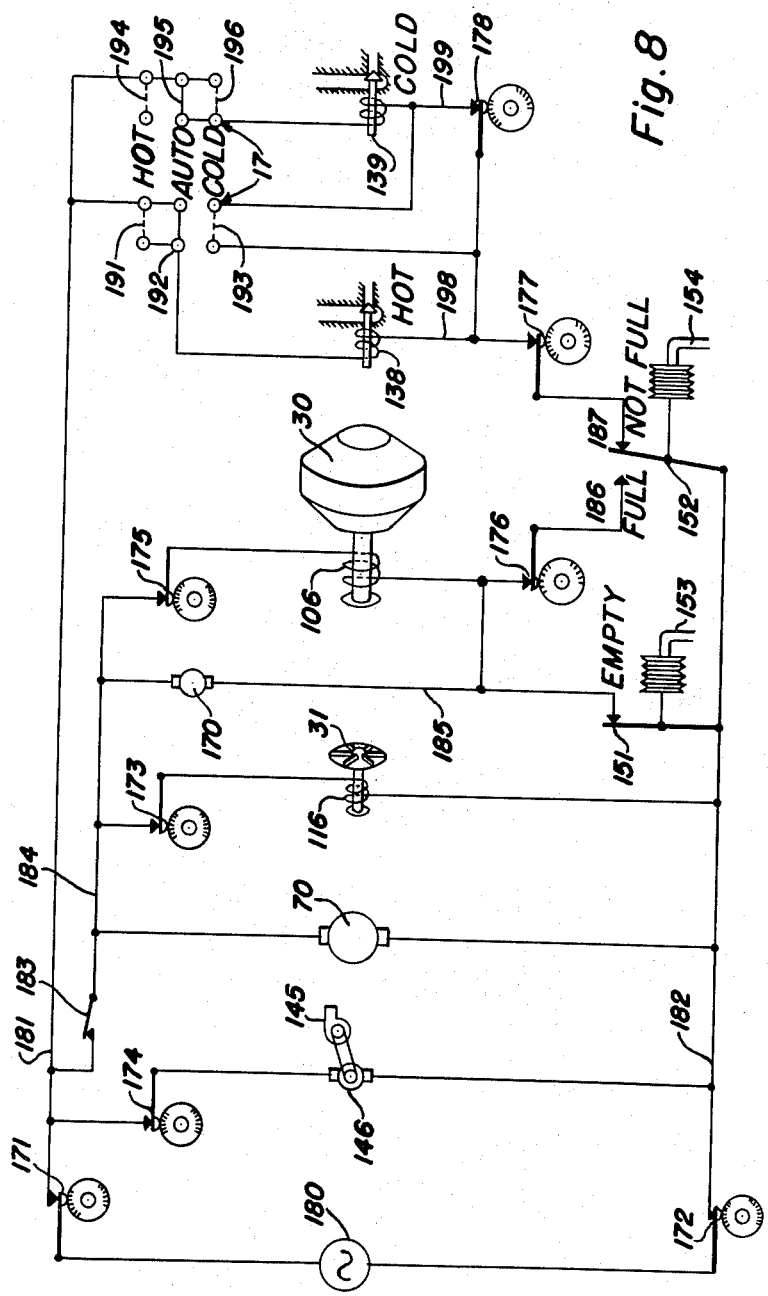
FIGURE 8 is a schematic circuit diagram.
Figure 9:
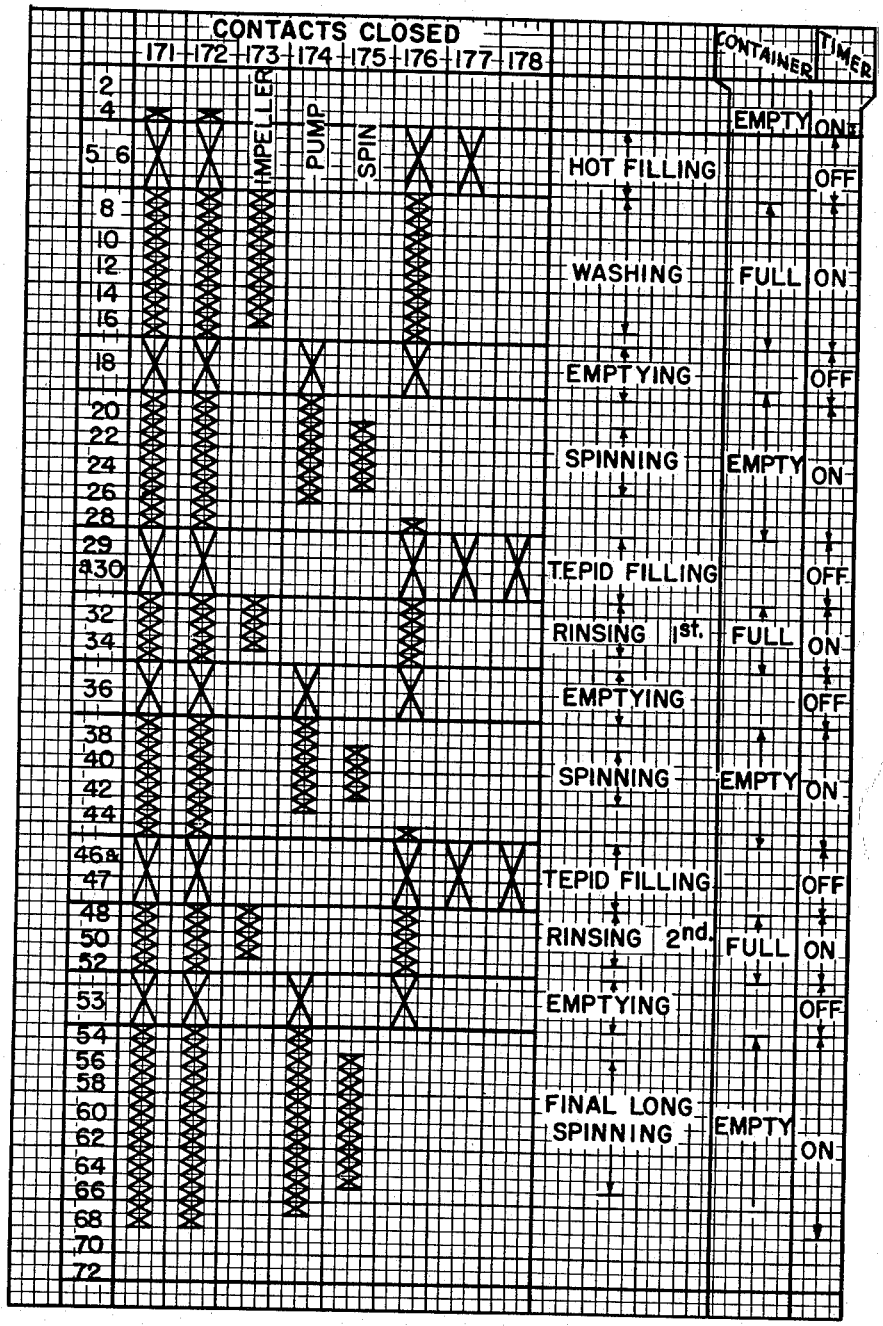
FIGURE 9 is a timing schedule of the complete washing and drying cycle.

FIGURE 8 is a schematic diagram showing the arrangement of the circuits, while FIGURE 9 is a timing diagram indicating which contacts are closed during each of the seventy-two divisions of a complete washing and drying cycle. From the detailed description given below it will be observed that the seventy-two divisions do not quite represent the whole of the cycle since the timer 150 is switched off during filling and emptying stages as a result of the level-responsive switches 151 and 152. Accordingly a number of the divisions (actually Nos. 5 and 6, 18, 29 and 30, 36, 46 and 47 and 53) are prolonged by whatever periods are required for the hot and/or cold water supply to fill the container through the hot and/or cold valves and whatever periods are required for the emptying pump 145 to empty the container 25.

It is believed that the electric circuit will be clear from FIGURE 8. Thus a source of current 180 has one terminal connected through the timer contacts 71 to a busbar 181 and its other terminal is connected through the timer contacts 172 to a busbar 182. A door controlled busbar 184 is connected to the busbar 181 through a door-controlled switch 183 which is closed only when the door 13 is closed. The main driving motor 70 is connected between the busbars 184 and 182. The impeller solenoid 116 is connected in series with the timer contacts 173 across the busbars 184 and 182. The pump motor 146 is connected in series with the timer contacts 174 across the busbars 181 and 182.

The timer motor 170 has one terminal connected to the busbar 184 and its other terminal connected by a conductor 185 which in turn is connected through the close-when-empty level-responsive switch 151 to the busbar 182. The basket spinning solenoid 106 has one terminal connected through the timer contacts 175 to the busbar 184 and its other terminal connected to the conductor 185. In addition the conductor 185 is connected through the timer contacts 176 and the close-when-full contacts 186 of the level-responsive switch 152 to the busbar 182.

The hot-automatic-cold switch 17 has pairs of contacts 191 to 196. In the normal automatic position the hot solenoid 138 has one terminal connected through the contacts 192 to the busbar 181 and the other terminal connected to a conductor 198 which is connected through the timer contacts 177 to the close-when-not-full contacts 187 of the level-responsive switch 152, and thence to the busbar 182. The coil solenoid 139 normally has one terminal connected through the contacts 195 of the hot-automatic-cold switch to the busbar 181 and its other terminal connected through a conductor 199 and through the timer contacts 178 to the conductor 198.

In the hot position of the hot-automatic-cold switch 17 the contacts 191 and 194 are closed whereby the contacts 191 are in parallel with the contacts 192 so that the operation of the hot solenoid is unaffected, while the contacts 194 are not connected so that the circuit of the cold solenoid 139 is in any event broken. In the cold position the contacts 193 and 196 are closed whereby the latter are in parallel with the contacts 195 so that the operation of the cold solenoid 139 is unaffected. The contacts 193 are in parallel with the timer contacts 178 so that in this position the contacts 178 are short-circuited and the operation of the cold solenoid is not dependent upon the timer contacts 178, and the hot solenoid 138 is open circuited.

The sequence of operation of the time contacts may be followed with the aid of FIGURE 9 in which the left-hand column indicates the seventy-two successive intervals of the timer, and in the next eight columns a cross indicates whether each of the timer contacts 171 to 178 is closed during that particular interval. The columns on the right are thought to be self-explanatory and indicate respectively the various operations that occur, whether the container is empty or full and whether the timer is on or off.

*Program*

The program of the complete cycle will now be briefly described.

During intervals 0–3 all contacts are open so that the whole circuit is isolated from the supply and in order to start the cycle it is necessary to move the timer manually to position 4.

In order to start the cycle the user places a suitable charge of clothes in the basket together with an appropriate quantity of soap or detergent. She then closes the door thereby closing the switch 183 and manually moves the timer to position 4 by turning the dial 16.

In interval 4 contacts 171 and 172 close to connect the busbars 181 and 182 to the source of current. As these contacts remain closed throughout the cycle from interval 4 to interval 68 inclusive it will not be thought necessary to mention them again. In intervals 5 and 6 contacts 176 and 177 also close. It will be appreciated that throughout the washing cycle, provided the door 13 is left closed, the basket 30 is continuing to rotate at a slow speed. Contacts 176 provide the return circuit for the timer motor 170 through the close-when-full contacts 186 to ensure that the timer 150 will start again when the container has been filled as referred to below. Contacts 177 close the return circuit for the hot solenoid 138 through the not-full contacts 187, thereby admitting hot water from the hot supply. As soon as the water level in the container 25 rises above the empty mark the close-when-empty switch 151 opens and stops the timer 150, so that interval number 5 or 6 is prolonged for whatever period may be necessary to fill the container 25. When the container is full the switch 152 snaps over from the not-full contacts 187 to the full contacts 186 thereby releasing the hot solenoid 138 and shutting off the supply of hot water, and at the same time restarting the timer motor 170. During the remainder of interval 6, or of intervals 5 and 6, nothing further happens and the basket merely rotates at a slow speed.

The reason for allowing two intervals, Nos. 5 and 6, for filling, is that if the filling rate is very slow the first interval might expire before the empty mark had been reached and the timer stopped to prolong the interval. Without interval 6 the operation might then continue and washing begin with the container nearly empty. Moreover if the user should move the timer through interval 5 initially, interval 6 will still be available to allow the level to reach the full mark.

During intervals 7–16 contacts 173 and 176 are closed. The latter serve as before to keep the timer running through the close-when-full contacts 186. They perform this function throughout the majority of the cycle and it will not be considered necessary to point it out again. Contacts 173 energize the impeller solenoid 116 and drive the impeller 31 for a washing cycle.

In interval 17 only contacts 176 remain closed to keep the timer going.

In interval 18 contacts 174 are also closed, energizing the pump motor 146 to drive the emptying pump 145 and start emptying the container. When the level has fallen below the "full" mark the close-when-full contacts 186 of the switch 152 will open, thereby stopping the timer motor 170 so that interval 18 is prolonged as much as may be necessary to allow the container to be emptied. When the container is empty the close-when-empty contacts 151 will close and restart the timer motor 170.

In intervals 19 and 20 contacts 174 remain closed so that the pump 145 continues to run but contacts 176 are opened. These contacts remain open throughout the spinning period about to take place, in order to ensure that the only return circuit for both the spinning solenoid 106 and the timer motor 170 is through the close-when-empty switch 151 as more fully explained below.

In intervals 21 to 25 contacts 174 remain closed and contacts 175 close, so that the pump 145 continues to run and in addition the spinning clutch 105 is engaged and the basket 30 rotates at high speed. It will be observed that the circuits of both the timer and the spinning solenoid 106 find a return path only through the close-when-empty switch 151. Accordingly if the water centrifuged from the clothes is sufficient to raise the level in the container 25 above the empty mark the spinning clutch 105 will be disengaged and in addition the timer 150 will be stopped until such time as the pump (which is unaffected by the close-when-empty contacts) has had time to reduce the level again. This is a feature of very considerable importance since if an attempt is made to spin the basket 30 at high speed when it is immersed in water to any substantial depth the motor is liable to be overloaded. By the arrangement described this is avoided without the necessity of providing a large sump 50 or a large pump 145. A large pump is wasteful since it would only be working at maximum capacity for a very small fraction of the cycle, while a large sump is objectionable in that it would involve the use of a much larger quantity of hot water, in addition to increasing the energy and time required for filling and emptying. By the arrangement described the size of the sump and the amount of water required can be reduced to a minimum.

Actual capacities may of course vary but in one case a machine taking a dry clothes load of 8 lbs. employs 7 gallons of water, of which only about 1¾ gallons is situated in the sump and in the space between the container 25 and the basket 30. In other words nearly 75% of the total water volume is within the basket.

The opening of the contacts 176 ensures that there is no return circuit through the close-when-full contacts 186 of the switch 152. This is a safeguard to ensure that the spinning solenoid 106 can only be energized when the container is empty and not when it is full. Thus for example if the user should manually advance the timer during the washing cycle so as to cut out the emptying cycle (interval 18) contacts 175 might be closed with the container full. Similarly if the emptying pump failed or became blocked interval 18 might finish and contacts 175 close with the container still full.

The fact that the timer 150 is switched off whenever the spinning solenoid 106 is de-energized by opening of close-when-empty switch 151 ensures that the full period of spinning will be provided not taking into account any periods during which the spinning clutch is de-energized.

In interval 26 the contacts 175 open and disengage the spinning clutch 105 and the contacts 174 remain closed so that the pump continues to run.

In interval 27 the contacts 174 open to shut off the pump 145 and in fact none of the timer contacts are closed (except for contacts 171 and 172).

In interval 28 contacts 176 again close preparatory to the next filling cycle for the purpose already explained above.

In intervals 29 and 30 contacts 177 and 178 also close, thereby opening both the hot valve 138 and the cold valve 139 so as to supply a mixture of hot and cold water. As soon as the level rises above the empty mark the close-when-empty switch 151 opens, thereby stopping the timer. When the container 25 is full of tepid water the timer is started again through the contacts 176 and the close-when-full contacts 186. The two intervals Nos. 29 and 30 are provided for this filling for the same reasons as for the first filling in intervals 5 and 6.

In intervals 31 to 34 contacts 173 also close so that the impeller 31 is driven for a first rinsing period during which the operation is similar to the washing period of intervals 7–16 except that the first rinsing period is shorter, the water is not so hot, and there is of course no added soap in it.

In interval 35 contacts 173 are open so that the impeller 31 stops but contacts 176 remain closed.

Interval 36, with contacts 174 and 176 closed, is a repetition of interval 18 during which the container 25 is emptied.

Intervals 37–45 are a repetition of intervals 19 to 28 except that the spinning is slightly shorter.

Intervals 46 and 47, the second tepid filling cycle, are a precise repetition of intervals 29 and 30, the first tepid filling cycle.

Intervals 48–52, the second rinsing cycle, are a precise repetition of intervals 31–35, the first rinsing cycle.

Interval 53, emptying again, is a precise repetition of intervals 18 and 36.

Intervals 54–68, the final long spinning, are similar to intervals 19–28 and intervals 37–45, the initial spinning periods, with the exception that the final spinning is more prolonged and the pump 145 continues to run for an extra long interval. Thus contacts 174 are closed during intervals 54 and 55 to run the pump; during intervals 56–65 these contacts remain closed and the pump 145 continues to run while in addition contacts 175 are closed to run the basket 30 at spinning speed. In intervals 66 and 67 contacts 175 are open so that the basket slows down again while contacts 174 remain closed so that the pump continues to run. In interval 68 contacts 174 are open so that the pump is shut off and in fact no timer contacts are closed (except for contacts 171 and 172).

Finally at the end of interval 68 contacts 171 and 172 are opened thereby stopping the timer motor and isolating the whole circuit by cutting off the busbars 181 and 182 from the supply. Accordingly the timer remains in position 69 until it is manually moved on again to position 4 in order to begin the next cycle.

The cycle has been described on the assumption that the hot-automatic-cold switch 17 is left in the automatic position. In this case the first filling for washing is with hot water, and each subsequent filling for rinsing is with tepid water, namely a mixture of hot and cold. This may be modified by the user at any moment by operation of the switch 17. For example, if a cold rinse is wanted she can move the switch to the cold position any time after the hot filling. Or again if the hot water is too hot for washing she can switch to cold during a portion of the hot filling period, and similarly to adjust the rinse temperature she can switch to hot or cold during the course of the tepid filling for as long as may be required to effect the desired adjustment.

The door operated contacts 183 control all the circuits except the filling and pump circuits, so that if at any time the user opens the door and puts her hand into the machine the basket and the impeller will both stop and there is no danger of her hand coming into contact with moving parts. On the other hand since the filling circuits are independent of the door-controlled contacts the user can if she wishes open the door during a filling period to feel the temperature of the water without interfering with the filling operation. Also as the operation of the pump is independent of the door operated contacts it will continue to empty the container even if the user should open the door while it is doing so, for example during or immediately after the final stages of a spinning cycle.

The actual time of the cycle and its various parts will vary with circumstances but in one specific case each of the 72 intervals of the timer (of which the cycle actually uses 65) represents 22½ seconds, making a total of about 25 minutes. To this must be added the filling and emptying period, of which each hot filling period might be of the order of 2 minutes and each tepid filling period and each emptying period of the order of 1 minute, making a total cycle of the order of 32 minutes.

On the other hand certain of the periods may in some cases be reduced, without sacrifice, for example the early spinning periods and certain of the intervals, bringing the total cycle time down to perhaps 25 minutes.

I claim:

In a washing and spin drying machine; a container having a comparatively small liquid capacity; a spin basket rotatively mounted within said container, a comparatively low capacity pump having its inlet connected to said container for pumping liquid therefrom; means for rotating said basket at a high speed for a spin extracting operation and for operating said pump to empty said container; a timer for timing a washing cycle including a container emptying operation and a spin drying operation in which said basket is rotated at a high speed; said pump operating means being operative during said spin drying operation and liquid level responsive means responsive to predetermined high and low liquid levels in said container; said liquid level responsive means being operative to stop said timer during said emptying operation when the liquid level in said container falls below said predetermined high level, to restart said timer when the liquid level falls below said predetermined low liquid level and to stop operation of said high speed spin drying operation and said timer should the liquid level in said container rise above said predetermined low liquid level.

References Cited in the file of this patent
UNITED STATES PATENTS 2,288,141    Oliver _____ June 30, 1942
2,662,384    Morrison et al. _____ Dec. 15, 1953